United States Patent
Buonacuore et al.

(10) Patent No.: US 9,961,054 B2
(45) Date of Patent: May 1, 2018

(54) APPARATUS AND METHOD FOR ESTABLISHING SECURE COMMUNICATION WITH REDUNDANT DEVICE AFTER SWITCHOVER

(71) Applicant: Honeywell International Inc., Morristown, NJ (US)

(72) Inventors: Christopher Buonacuore, Collegeville, PA (US); James Schreder, Lansdale, PA (US); Gary Drayton, King of Prussia, PA (US)

(73) Assignee: Honeywell International Inc., Morris Plains, NJ (US)

( * ) Notice: Subject to any disclaimer, the term of this patent is extended or adjusted under 35 U.S.C. 154(b) by 385 days.

(21) Appl. No.: 14/311,572

(22) Filed: Jun. 23, 2014

(65) Prior Publication Data

US 2015/0215300 A1   Jul. 30, 2015

Related U.S. Application Data (60) Provisional application No. 61/933,081, filed on Jan. 29, 2014.

(51) Int. Cl.
*H04L 29/06* (2006.01)
*G05B 15/02* (2006.01)
(Continued)

(52) U.S. Cl.
CPC .......... *H04L 63/061* (2013.01); *H04L 63/205* (2013.01); *H04L 41/0668* (2013.01); *H04L 63/164* (2013.01); *H04L 69/40* (2013.01)

(58) Field of Classification Search
CPC . H04L 63/061; H04L 63/205; H04L 41/0668; H04L 69/40; H04L 63/164
See application file for complete search history.

(56) References Cited

U.S. PATENT DOCUMENTS

| 6,170,044 B1 | 1/2001 | McLaughlin et al. |
| 6,272,386 B1 * | 8/2001 | McLaughlin ........ G05B 19/058 700/82 |

(Continued)

FOREIGN PATENT DOCUMENTS

KR   20070037621 A   4/2007

OTHER PUBLICATIONS

International Search Report dated Apr. 22, 2015 in connection with International Application No. PCT/US2015/011978; 3 pages.

(Continued)

*Primary Examiner* — Mary Li (57) ABSTRACT

A method includes transitioning a device in an industrial process control and automation system from a secondary role to a primary role during a switchover and, in response to the switchover, clearing one or more security values stored by the device. The method also includes receiving a message at the device from a network node and, in response to determining that no security association is associated with the received message or the network node, exchanging security credentials and establishing a trust relationship with the network node. Transitioning the device includes assuming a network address of another device that previously operated in the primary role, that previously communicated with the network node, and that previously had a security association with the network node. Clearing the security value(s) can prevent the device from having the trust relationship associated with the network node when the device receives the message from the network node.

20 Claims, 3 Drawing Sheets

(51) Int. Cl.
*H04L 29/14* (2006.01)
*H04L 12/24* (2006.01)

(56) References Cited

U.S. PATENT DOCUMENTS

| | | | |
|---|---|---|---|
| 7,689,722 B1 | 3/2010 | Timms et al. | |
| 7,944,814 B2 | 5/2011 | Nissan et al. | |
| 2006/0020853 A1 | 1/2006 | Alex et al. | |
| 2007/0260870 A1 | 11/2007 | Nissan et al. | |
| 2007/0277035 A1* | 11/2007 | Patel | H04L 9/0822 713/168 |
| 2008/0114961 A1 | 5/2008 | Ramaswamy et al. | |
| 2008/0151892 A1* | 6/2008 | Arena | H04L 61/2046 370/392 |
| 2008/0155262 A1* | 6/2008 | Beaver | H04L 9/3263 713/173 |
| 2011/0145585 A1 | 6/2011 | Campagna et al. | |
| 2011/0258433 A1* | 10/2011 | Pulini | H04L 63/20 713/153 |
| 2014/0108781 A1* | 4/2014 | Zhang | H04L 63/04 713/151 |

OTHER PUBLICATIONS

Written Opinion of the International Searching Authority dated Apr. 22, 2015 in connection with International Application No. PCT/US2015/011978; 5 pages.

G. Huang, et al., "A Traffic-Based Method of Detecting Dead Internet Key Exchange (IKE) Peers", Network Working Group, Feb. 2004, 13 pages.

Paul F. McLaughlin, et al., "Redundant Process Controllers for Segregated Supervisory and Industrial Control Networks", U.S. Appl. No. 14/272,058, filed May 7, 2014.

* cited by examiner

APPARATUS AND METHOD FOR ESTABLISHING SECURE COMMUNICATION WITH REDUNDANT DEVICE AFTER SWITCHOVER

CROSS-REFERENCE TO RELATED APPLICATION AND PRIORITY CLAIM

This application claims priority under 35 U.S.C. § 119(e) to U.S. Provisional Patent Application No. 61/933,081 filed on Jan. 29, 2014. This provisional patent application is hereby incorporated by reference in its entirety.

TECHNICAL FIELD

This disclosure relates generally to industrial process control and automation systems. More specifically, this disclosure relates to an apparatus and method for establishing secure communication with a redundant device after a switchover.

BACKGROUND

Industrial process control and automation systems are often used to automate large and complex industrial processes. These types of systems routinely include sensors, actuators, and controllers. The controllers typically receive measurements from the sensors and generate control signals for the actuators.

Controllers and other devices in an industrial process control and automation system are typically connected to and communicate over one or more networks. Some devices in an industrial process control and automation system (such as more critical controllers) are arranged as redundant pairs, where one device in each pair operates in a primary role and another device in each pair operates in a secondary or redundant role. A secondary device is designed to switch into the primary role during a switchover, such as when the primary device suffers a power failure, hardware failure, or other problem.

SUMMARY

This disclosure provides an apparatus and method for establishing secure communication with a redundant device after a switchover.

In a first embodiment, a method includes transitioning a device in an industrial process control and automation system from a secondary role to a primary role during a switchover and, in response to the switchover, clearing one or more security values stored by the device. The method also includes receiving a message at the device from a network node and, in response to determining that no security association is associated with the received message or the network node, exchanging security credentials and establishing a trust relationship with the network node. Transitioning the device includes assuming a network address of another device that previously operated in the primary role, that previously communicated with the network node, and that previously had a security association with the network node.

In a second embodiment, a device includes at least one memory configured to store one or more security values. The device also includes at least one processing device configured to transition the device from a secondary role to a primary role in an industrial process control and automation system during a switchover and clear the one or more security values in response to the switchover. The at least one processing device is also configured to receive a message at the device from a network node and, in response to determining that no security association is associated with the received message or the network node, exchange security credentials and establish a trust relationship with the network node. The at least one processing device is configured to transition the device by assuming a network address of another device that previously operated in the primary role, that previously communicated with the network node, and that previously had a security association with the network node.

In a third embodiment, a non-transitory computer readable medium embodies a computer program. The computer program includes computer readable program code for transitioning a device in an industrial process control and automation system from a secondary role to a primary role during a switchover and, in response to the switchover, for clearing one or more security values stored by the device. The computer program also includes computer readable program code for receiving a message at the device from a network node and, in response to determining that no security association is associated with the received message, for exchanging security credentials and establishing a trust relationship with the network node. Transitioning the device includes assuming a network address of another device that previously operated in the primary role, that previously communicated with the network node, and that previously had a security association with the network node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
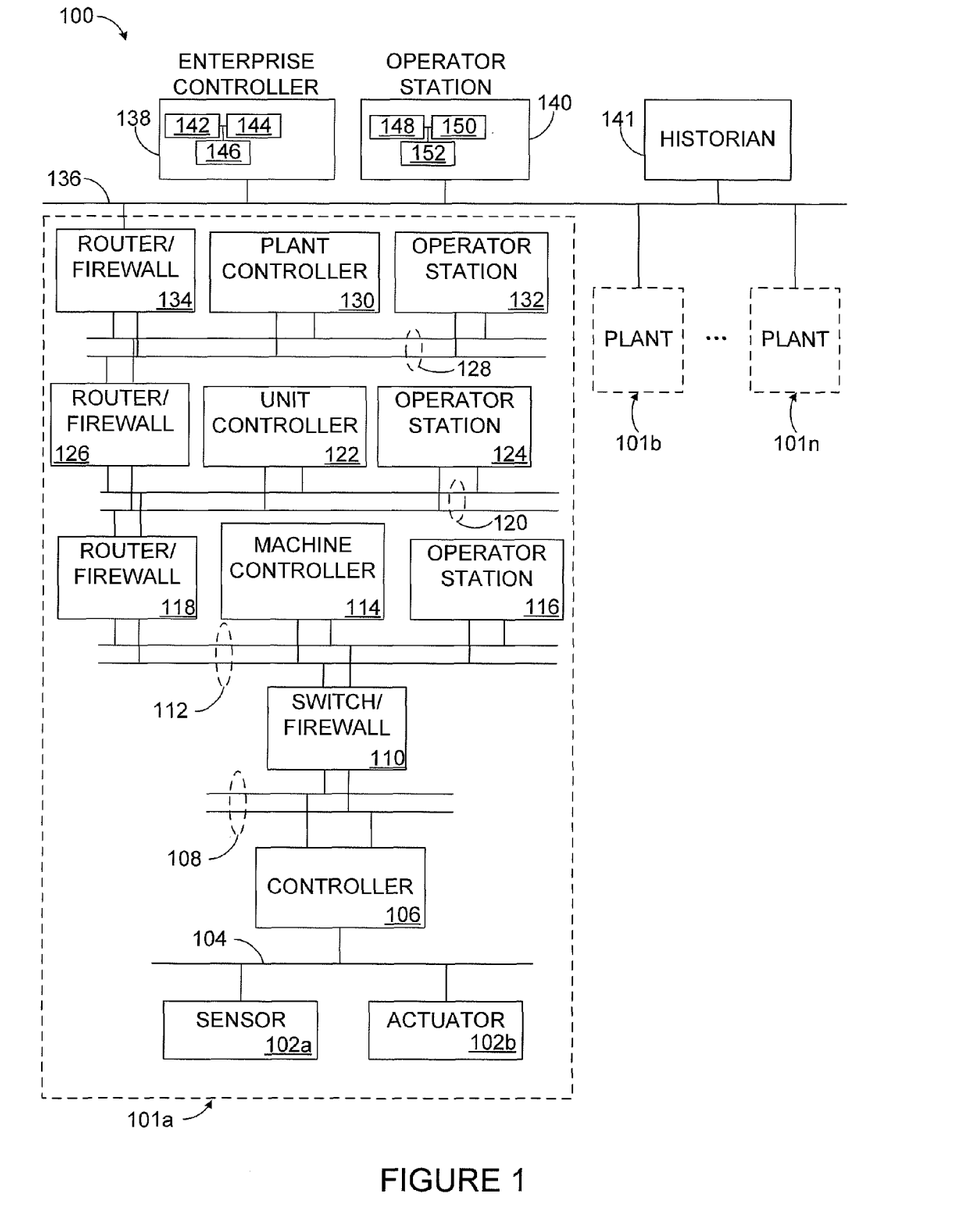
FIGS. 1 and 2 illustrate an example industrial process control and automation system and related details according to this disclosure.
Figure 2:
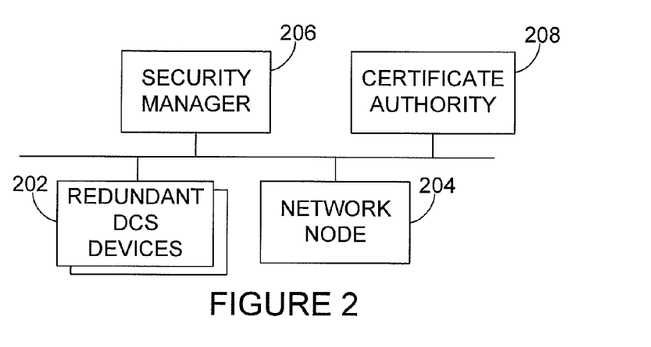

FIGS. 1 and 2 illustrate an example industrial process control and automation system 100 and related details according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Various devices shown in FIG. 1 can be arranged in redundant pairs or other redundant sets of devices. For example, various critical or other controllers could be arranged in redundant pairs, where each pair includes (i) a primary controller that actively performs control actions in a primary role and (ii) a secondary controller that passively operates in a secondary role. The secondary controller could receive the same data as the primary controller and perform the same calculations as the primary controller, but the secondary controller could refrain from outputting signals to implement control actions. This allows the secondary controller to switch into the primary role when needed or desired, such as when the primary controller fails. Any other redundant set(s) of distributed control system (DCS) devices could be used in the industrial process control and automation system 100.

In order to prevent malicious access to components in an industrial process control and automation system, various technologies have been employed to secure networks in the system (such as networks 108, 112, 120, 128, and 136). For example, the Internet Protocol Security (IPsec) protocol suite can be enabled on various components in an industrial process control and automation system. The IPsec protocol suite is typically used to establish a trust relationship between components attempting to interact. In the following description, a "DCS device" represents one of multiple components arranged in a redundant pair or other redundant set of components. Also, a "network node" represents a component that interacts with one or more DCS devices. This distinction is made merely for convenience and does not prevent, for example, a component from functioning both as a DCS device and as a network node.

When DCS devices in an industrial process control and automation system are arranged in redundant pairs or other redundant sets, the secondary DCS devices often use floating network addresses (such as IP address). In this configuration, when a primary DCS device fails, its secondary DCS device assumes the primary role and often assumes the primary DCS device's network address. If a trust relationship existed with the primary DCS device before the switchover, that trust relationship needs to be reestablished with the secondary DCS device after the switchover. This disclosure provides techniques for reestablishing a trust relationship when a secondary device takes over a primary role during a switchover, such as by using IPsec.

Details of this functionality are shown in FIG. 2, where redundant DCS devices 202 interact with a network node 204. The DCS devices 202 and the network node 204 could represent any suitable components in a control system, such as any of the controllers, servers, or operator stations shown in FIG. 1. For example, the DCS devices 202 could represent a redundant pair of controllers or servers, and the network node 204 could represent a controller, server, or operator station that interacts with the DCS devices 202.

Also shown in FIG. 2 are a security manager 206 and a certificate authority (CA) 208. The security manager 206 operates to maintain information about components that have been configured or are in the process of being configured to support secure communications in an industrial process control and automation system. The security manager 206 also provides security credentials (such as digital certificates) and communication policies to the components, allowing the components to communicate securely with one another. A policy provides information on how two components should communicate and can be used to configure IPsec. The certificate authority 208 generates the digital certificates or other security credentials provided by the security manager 206.

The security manager 206 includes any suitable structure for providing security credentials to DCS components, such as a computing device having one or more processing devices, one or more memories, and one or more network interfaces. There could be one or multiple security managers 206 in the system, such as a redundant pair of security managers 206. The certificate authority 208 includes any suitable structure for generating security credentials, such as a computing device having one or more processing devices, one or more memories, and one or more network interfaces. The security manager 206 and certificate authority 208 could also be used at any suitable level(s) in the industrial process control and automation system 100. For example, in some embodiments, the security manager 206 and certificate authority 208 could represent Level 3, Level 4, or Level 5 components and be used to secure DCS components at Level 1, Level 2, or Level 3 of the system 100.

Although FIGS. 1 and 2 illustrate one example of an industrial process control and automation system 100 and related details, various changes may be made to FIGS. 1 and 2. For example, a control and automation system could include any number of sensors, actuators, controllers, operator stations, networks, DCS devices, network nodes, security managers, and certificate authorities. Also, the makeup and arrangement of the system 100 in FIGS. 1 and 2 are for illustration only. Components could be added, omitted, combined, or placed in any other suitable configuration according to particular needs. As a particular example, the security manager 206 and certificate authority 208 could be combined into a single functional unit. Further, particular functions have been described as being performed by particular components of the system 100. This is for illustration only. In general, process control and automation systems are highly configurable and can be configured in any suitable manner according to particular needs. In addition, FIGS. 1 and 2 illustrate an example environment in which a trust relationship can be reestablished with a secondary device that assumes a primary role during a switchover. This functionality can be used in any other suitable device or system.

Figure 3:
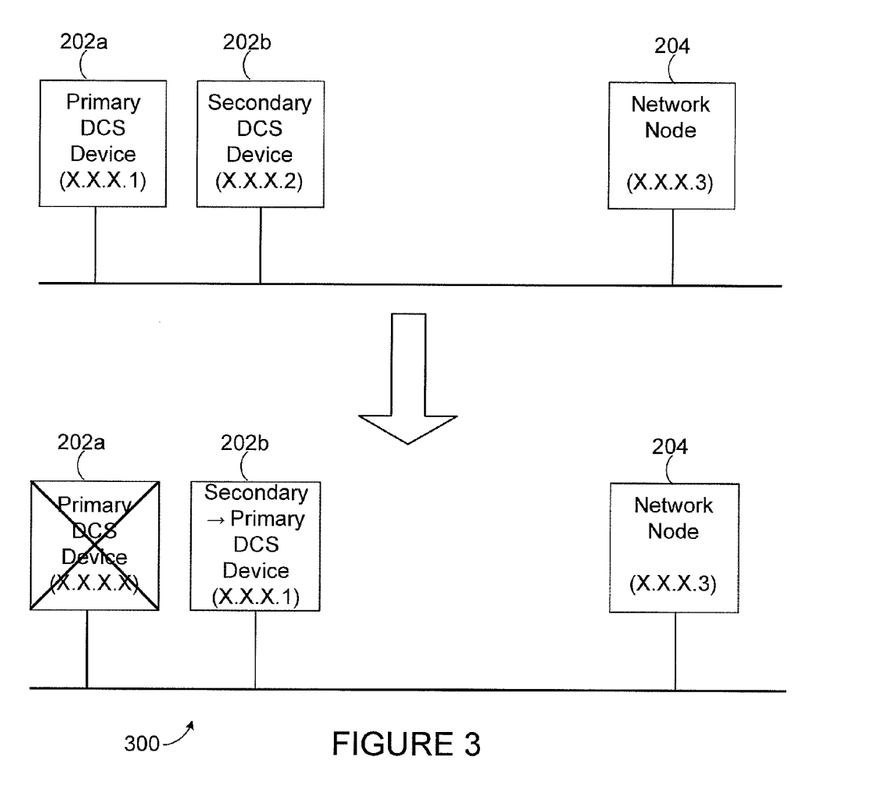
FIG. 3 illustrates an example switchover from a primary device to a secondary device in an industrial process control and automation system according to this disclosure.

FIG. 3 illustrates an example switchover 300 from a primary device to a secondary device in an industrial process control and automation system according to this disclosure. For ease of explanation, the switchover 300 shown in FIG. 3 is described with respect to the components of FIG. 2 operating in the system 100 of FIG. 1. The switchover 300 could be used with any other suitable components in any suitable system.

As shown in FIG. 3, the system includes two DCS devices 202a-202b operating as a redundant pair, where the DCS device 202a operates in the primary role and the DCS device 202b operates in the secondary role. The DCS device 202a has its own network address (X.X.X.1 in this example), and the DCS device 202b has a different network address (X.X.X.2 in this example). The DCS device 202a in the primary role can establish a security association or other trust relationship with the network node 204, which has its own network address (X.X.X.3 in this example).

In order to prevent malicious access to components on a network, IPsec or other security protocol can be enabled on the components. Thus, for example, the DCS device 202a and the network node 204 can interact in a secure manner, while the DCS device 202b remains in the standby or secondary role. IPsec establishes a trusted relationship between a network node and a device that the network node is trying to access, such as between the primary DCS device 202a and the network node 204.

As noted above, many industrial process control and automation devices are redundant and use floating network addresses when their primary devices fail. This means that, upon a failure of a primary DCS device, its secondary DCS device assumes the primary role as well as the primary device's network address. An example of this is shown in FIG. 3, where the secondary DCS device 202b assumes the primary role and the primary device's network address (X.X.X.1) upon a failure of the primary DCS device 202a.

Assume the network node 204 is accessing data from the primary DCS device 202a, where both components 202a and 204 are configured with IPsec. By using IPsec, the components 202a and 204 form trusted relationships with each other, allowing for secure communications between the components 202a and 204. However, the trust relationships present a problem when the primary DCS device 202a fails and the secondary DCS device 202b takes over the primary role. Since the trust relationships were established using an IP address of the DCS device 202a, the DCS device 202b will not be trusted by the network node 204.

Under conventional approaches, the DCS device 202b would drop all packets from the network node 204 because a trust relationship had not been established. With both sides unable to trust one another, the components 202b and 204 would be unable to communicate until a dead band timeout occurs and the components 202b and 204 can renegotiate a trust relationship. Unfortunately, while waiting for the dead band timeout to occur, there is no effective communication between the components 202b and 204 for that period of time. With no communication between the components 202b and 204, a loss of view to the primary device occurs, which can be detrimental to the control system's operations.

In accordance with this disclosure, a technique is provided to reestablish a trust relationship when a secondary device takes over as a primary device. Instead of waiting for a dead band timeout, the new primary device (the DCS device 202b) performs the following operations to reestablish a trust relationship with the network node 204. After the switchover, the new primary DCS device 202b removes security credentials, communication policies, and other information that it had previously configured or used. Once a secured payload, such as an Encapsulation Security Payload (ESP) message, is received, the new primary DCS device 202b cannot find security credentials or communication policies for the received message, and the new primary DCS device 202b initiates a key exchange with the network node 204. This re-establishes a trust relationship between the DCS device 202b and the network node 204, but it can be accomplished more quickly than waiting for the dead band timeout.

Although FIG. 3 illustrates one example of a switchover 300 from a primary device to a secondary device in an industrial process control and automation system, various changes may be made to FIG. 3. For example, the network addresses shown here are examples only, and the nodes need not have consecutive network addresses. Also, a redundant pair of DCS nodes could communicate with any number of other devices for which secure communication connections can be established.

Figure 4:
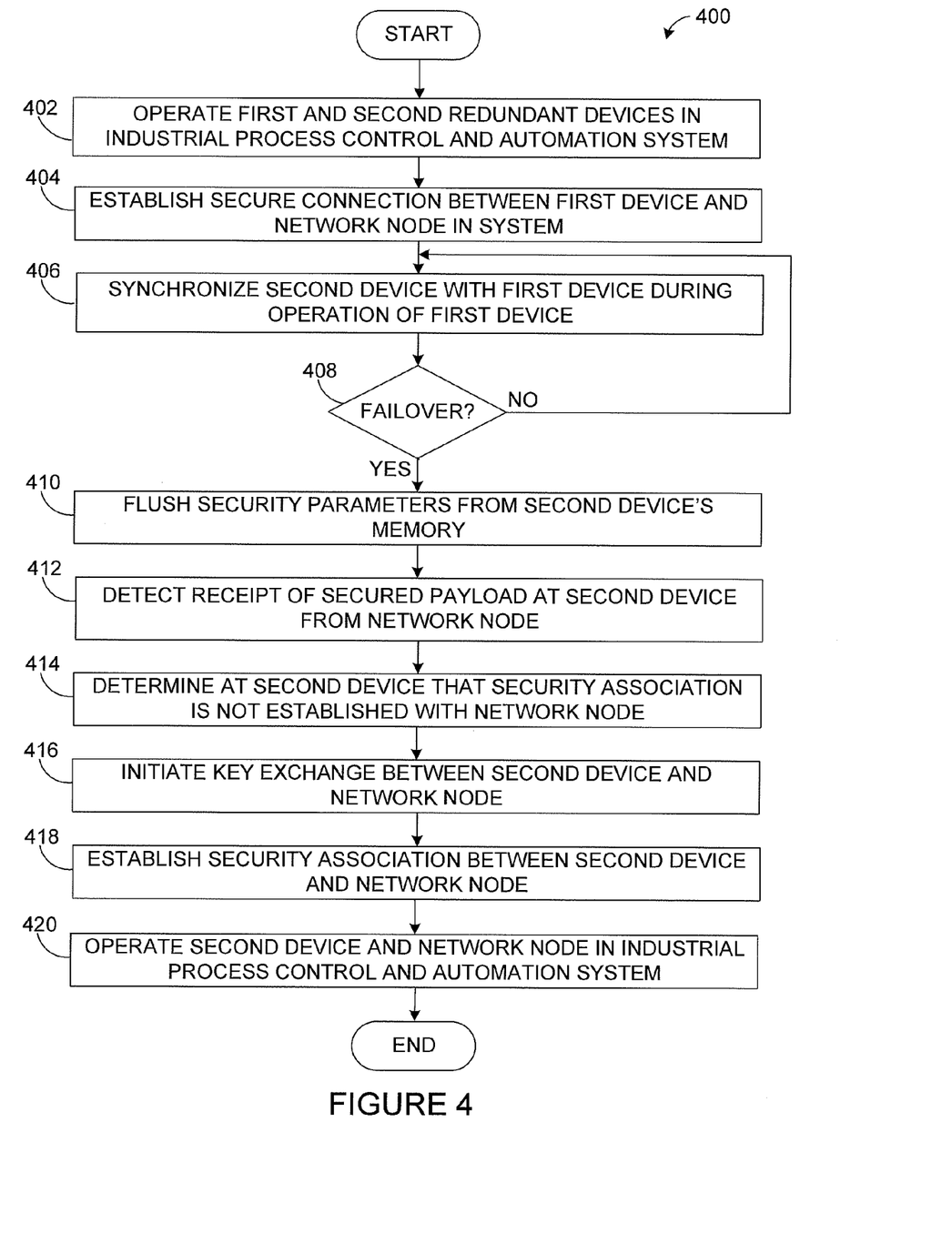
FIG. 4 illustrates an example method for establishing secure communication with a redundant device after a switchover in an industrial process control and automation system according to this disclosure.

FIG. 4 illustrates an example method 400 for establishing secure communication with a redundant device after a switchover in an industrial process control and automation system according to this disclosure. For ease of explanation, the method 400 is described with respect to the components of FIG. 2 operating in the system 100 of FIG. 1. The method 400 could be used with any other suitable components in any suitable system.

First and second redundant devices are operated in an industrial process control and automation system at step 402. This could include, for example, operating the DCS devices 202a-202b as a redundant pair of process controllers or servers. The DCS device 202a could be operating in the primary role, and the DCS device 202b could be operating in the secondary role. A secure connection is established between the first device and a network node in the system at step 404. This could include, for example, the primary DCS device 202a establishing a secure connection with the network node 104 using IPsec. The second device is synchronized with the first device during operation of the first device at step 406. This could include, for example, the secondary DCS device 202b receiving the same data that is received by the primary DCS device 202a and performing the same computations as the primary DCS device 202a.

A determination is made whether a failover occurs at step 408. This could include, for example, the primary DCS device 202a failing or otherwise suffering a fault that triggers the failover, which causes the secondary DCS device 202b to switch and begin operating in the primary role. As part of this failover process, the new primary DCS device 202b can assume the network address of the old primary DCS device 202a. The switchover could be detected at the secondary DCS device 202b as part of a continuous loop that monitors an Internet Key Exchange (IKE) session.

In order to help speed up reestablishment of a trust association with the network node, the second device flushes security parameters from its memory at step 410. This could include, for example, the new primary DCS device 202b flushing all security parameters index (SPI) values, IKE keys, and IPsec Security Policy Database (SPD) policies from its memory. Receipt of a secure payload is detected at step 412. This could include, for example, the new primary DCS device 202b receiving an ESP message from the network node 104 via a User Datagram Protocol (UDP) socket. The second device determines that a security association is not established with the network node at step 414. This could include, for example, the new primary DCS device 202b determining that the network node 104 that sent the ESP message is not associated with an established IP sec connection.

In response to determining that no security association has been established with the network node, a key exchange is initiated between the second device and the network node at step 416. This could include, for example, the new primary DCS device 202b initiating an IKE session with the network node 104 in order to exchange security credentials (such as authentication keys) with the network node 104. This allows the second device and the network node to establish a security association at step 418. As part of this process, the new primary DCS device 202b and the network node 104 can apply one or more specified communication policies to establish an IPsec connection between the components.

At this point, the second device and the network node can operate in the industrial process control and automation system at step 420. This could include, for example, the new primary DCS device 202b and the network node 104 operating to provide desired process control or automation functions, where the new primary DCS device 202b and the network node 104 engage in secure communications. The security association here can be established more quickly that simply forcing the new primary DCS device 202b to wait for a dead band timeout to occur.

Although FIG. 4 illustrates one example of a method 400 for establishing secure communication with a redundant device after a switchover in an industrial process control and automation system, various changes may be made to FIG. 4. For example, while shown as a series of steps, various steps in FIG. 4 could overlap, occur in parallel, occur in a different order, or occur multiple times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   detecting, at a first device, a failure associated with a second device that operated in a primary role, communicated with a network node in an industrial process control and automation system, and had a security association with the network node;
   prior to a switchover, synchronizing the first device with the second device as the second device communicates with the network node;
   in response to detecting the failure, transitioning the first device from a secondary role to the primary role during the switchover and clearing one or more security values stored by the first device and used while in the secondary role;
   receiving a message at the first device from the network node; and
   in response to determining that no security association is associated with the received message or the network node, exchanging security credentials and establishing a trust relationship with the network node;
   wherein transitioning the first device comprises assuming a network address of the second device.

2. The method of claim 1, wherein clearing the one or more security values comprises:
   flushing one or more Security Parameters Index (SPI) values, one or more authentication keys, and one or more communication policies from at least one memory of the first device.

3. The method of claim 1, wherein:
   receiving the message comprises receiving an encapsulation security payload from the network node; and
   the method further comprises determining that no security association is associated with the received encapsulation security payload.

4. The method of claim 1, wherein establishing the trust relationship comprises establishing the trust relationship using Internet Protocol Security (IPsec).

5. The method of claim 1, wherein the security credentials comprise one or more authentication keys.

6. The method of claim 1, wherein clearing the one or more security values prevents the first device from having the trust relationship associated with the network node when the first device receives the message from the network node.

7. The method of claim 1, wherein the first device comprises one of a redundant set of process controllers or servers.

8. A device comprising:
   at least one memory configured to store one or more security values; and
   at least one processing device configured to:
      detect a failure associated with a second device that operated in a primary role, communicated with a network node in an industrial process control and automation system, and had a security association with the network node, wherein the at least one processing device is configured to synchronize the device with the second device as the second device communicates with the network node prior to a switchover;
      in response to detecting the failure, transition the device from a secondary role to the primary role during the switchover and clear the one or more security values, the one or more security values used while in the secondary role;
      receive a message from the network node; and
      in response to determining that no security association is associated with the received message or the network node, exchange security credentials and establish a trust relationship with the network node;
   wherein the at least one processing device is configured to transition the device by assuming a network address of the second device.

9. The device of claim 8, wherein the at least one processing device is configured to flush one or more Security Parameters Index (SPI) values, one or more authentication keys, and one or more communication policies from the at least one memory.

10. The device of claim 9, wherein:
    the at least one processing device is configured to receive an encapsulation security payload from the network node; and
    the at least one processing device is further configured to determine that no security association is associated with the received encapsulation security payload.

11. The device of claim 8, wherein the at least one processing device is configured to establish the trust relationship using Internet Protocol Security (IPsec).

12. The device of claim 8, wherein the security credentials comprise one or more authentication keys.

13. The device of claim 8, wherein the at least one processing device is configured to clear the one or more security values in order to prevent the device from having the trust relationship associated with the network node when the device receives the message from the network node.

14. A non-transitory computer readable medium containing a computer program, the computer program comprising instructions that when executed cause at least one processing device of a first device to:
- detect a failure associated with a second device that operated in a primary role, communicated with a network node in an industrial process control and automation system, and had a security association with the network node;
- prior to a switchover, synchronize the first device with the second device as the second device communicates with the network node;
- in response to detecting the failure, transition the first device from a secondary role to the primary role during the switchover and clear one or more security values stored by the first device and used while in the secondary role;
- receive a message at the first device from the network node; and
- in response to determining that no security association is associated with the received message or the network node, exchange security credentials and establish a trust relationship with the network node;
- wherein the instructions that when executed cause the at least one processing device to transition the first device comprise instructions that when executed cause the first device to assume a network address of the second device.

15. The non-transitory computer readable medium of claim 14, wherein:
- the instructions that when executed cause the at least one processing device to receive the message comprise instructions that when executed cause the at least one processing device to receive an encapsulation security payload from the network node; and
- the non-transitory computer readable medium further contains instructions that when executed cause the at least one processing device to determine that no security association is associated with the received encapsulation security payload.

16. The non-transitory computer readable medium of claim 14, wherein the instructions that when executed cause the at least one processing device to clear the one or more security values comprise instructions that when executed cause the at least one processing device to flush one or more Security Parameters Index (SPI) values, one or more authentication keys, and one or more communication policies from at least one memory of the first device.

17. The non-transitory computer readable medium of claim 14, wherein the instructions that when executed cause the at least one processing device to clear the one or more security values in order to prevent the first device from having the trust relationship associated with the network node when the first device receives the message from the network node.

18. The non-transitory computer readable medium of claim 14, wherein the instructions that when executed cause the at least one processing device to establish the trust relationship comprise instructions that when executed cause the at least one processing device to establish the trust relationship using Internet Protocol Security (IPsec).

19. The non-transitory computer readable medium of claim 14, wherein the security credentials comprise one or more authentication keys.

20. The non-transitory computer readable medium of claim 14, wherein the first device comprises one of a redundant set of process controllers or servers.

* * * * *